United States Patent [19]

Ebata et al.

[11] 4,165,228

[45] Aug. 21, 1979

[54] PROCESS AND APPARATUS FOR HEAT TREATING EDGE OF PLATE GLASS

[75] Inventors: Yoshihiro Ebata, Kawanishi; Tsutomu Ueno, Ikeda; Nagamasa Kataoka, Kawanishi; Akimasa Akao, Higashi-murayama, all of Japan

[73] Assignees: Agency of Industrial Science and Technology, Tokyo; Central Glass Company Limited, Ube, both of Japan

[21] Appl. No.: 909,695

[22] Filed: May 25, 1978

[30] Foreign Application Priority Data

May 26, 1977 [JP] Japan .................................. 52-62008

[51] Int. Cl.² .......................................... C03B 29/00
[52] U.S. Cl. ......................................... 65/111; 65/104; 65/40; 65/273; 65/DIG. 4

[58] Field of Search ................. 65/103, 104, 106, 107, 65/273, 275, 40, 288, DIG. 4, 111, 65

[56] References Cited

U.S. PATENT DOCUMENTS

| 2,389,360 | 11/1945 | Guyer et al. .............................. 65/40 |
| 2,422,482 | 6/1947 | Guyer ............................... 65/111 UX |

*Primary Examiner*—Arthur D. Kellogg
*Attorney, Agent, or Firm*—Fleit & Jacobson

[57] ABSTRACT

The edge portion of a plate glass is locally heated to a temperature higher than that in the other portion of the plate glass, after the whole of the plate glass is heated. Electric current is thereafter applied to the edge portion of the plate glass in order to further heat the edge portion so that the edge of the plate glass is slightly melted.

18 Claims, 3 Drawing Figures

PROCESS AND APPARATUS FOR HEAT TREATING EDGE OF PLATE GLASS

BACKGROUND OF THE INVENTION

This invention relates to a process and apparatus for treating an edge of a plate glass, and more particularly to a process and apparatus for rounding off the corners of the edge of the plate glass.

It is well known in the art, that the corners of the edge of a plate glass are rounded off by being grinded with a grinding wheel carrying diamond abrasive or a circular grinding belt carrying abrasive. This grinding operation is, in general, carried out by rotating the grinding wheel or the grinding belt and by moving it along the edge of the plate glass.

However, such grinding operations encounter the following problems: the corners of the edge of the plate glass are considerably liable to chip off at an initial period of the grinding operation, and the surface rounded off is liable to have fine stripe markings along the length of the edge of the plate glass. Such defects are conspicuous particularly when using the grinding wheel, and those defects greatly contribute to lowering the values of the final products. Additionally, by the above-mentioned grinding operations, it is liable to occur that there remain fine streaks on the rounded edge surface of the plate glass, which streaks may lead to the breakdown of the plate glass.

Furthermore, in case of preparing window glasses, it has been necessary to further grinding the rounded edge of the plate glass with a fine grinding wheel after the above-mentioned step of rounding off the edge, in order to improve the smoothness and to polish the surface of the rounded edge. During this further grinding, it is necessary to apply a liquid such as water to cool and wash down the portion being ground. This is very troublesome and contributes to deterioration of the working environment.

SUMMARY OF THE INVENTION

It is the principal object of the present invention to provide an improved process and apparatus for treating the edges of a plate glass, by which fine plate glass of high quality can be obtained solving the problems encountered in the former art.

Another object of the present invention is to provide an improved process and apparatus for rounding off an edge of a plate glass, by which the edge of the plate glass can be made smooth and fire-polished by simple and safe operation.

A further object of the present invention is to provide an improved process and apparatus for rounding off an edge of a plate glass, in which the edge of the plate glass is slightly melted to be formed into the shape of a circular arc in cross-section by means of the heat generated by applying electric current to the edge of the plate glass.

A still further object of the present invention is to provide an improved process and apparatus for rounding off an edge of a plate glass, in which the edge of the plate glass is locally heated to a temperature higher than that of other portion of the plate glass and lower than the softening temperature of the plate glass after the whole of the plate glass is heated, and electric current is thereafter applied to the edge through a pair of electrodes which are in contact with the both side-surfaces of the edge of the plate glass, respectively.

Other objects, features and advantages of the process and apparatus in accordance with the present invention will be more apparent from the following description taken in conjunction with the accompanying drawings.

DESCRIPTION OF THE PREFERRED EMBODIMENT

Figure 1:
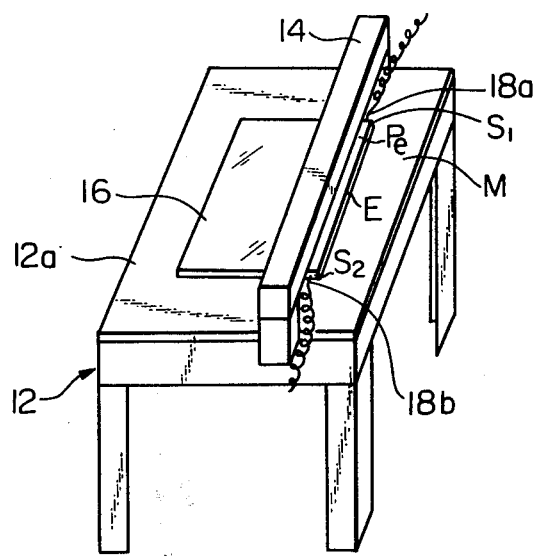
FIG. 1 is a perspective view showing an essential part of an apparatus according to the present invention.
Figure 2:
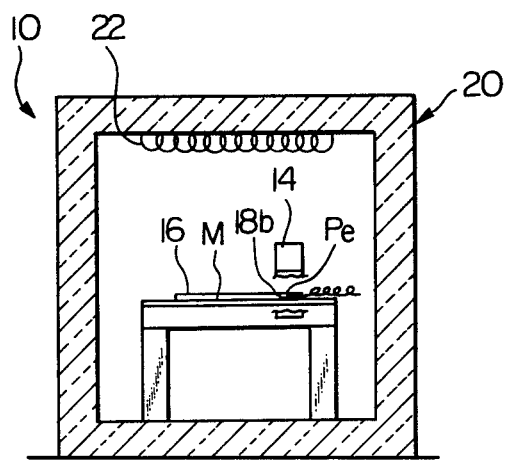
FIG. 2 is a cross-sectional view of the apparatus according to the present invention.

Referring now to FIGS. 1 and 2, there is shown a preferred embodiment of an apparatus 10 for treating an edge of a plate glass in accordance with the present invention. The apparatus 10 is composed of a heat-resistant table (made of iron) 12 or supporting means the flat surface 12a of which is covered with an electric insulating material M such as mica. The table 12 is equipped with an elongate heating unit 14 which is secured to the sides of the table 12. This heating unit 14 functions to locally heat an edge portion Pe including an edge E of the plate glass 16 which is mounted on the flat surface 12a of the table 12 as shown in FIG. 1. Accordingly, the heating unit 14 is disposed spaced apart from and as near as possible the surface of the plate glass 16. The reference nuemrals 18a and 18b denote a pair of electrodes which are electrically connected to an electric source (not shown) through lead wires (no numerals). The electrodes 18a and 18b are in the shape of a cylinder having a diameter of, for example, about 3 mm and are lightly contacted to the side surfaces $S_1$ and $S_2$ of the edge portion Pe, respectively, in order to prevent the edge portion Pe from warping or being injured when the edge portion Pe is softened by passing electric current through the electrodes to the edge portion Pe of the plate glass 16. Furthermore, each electrode is made of carbon, molybdenum or platinum etc. in order to prevent the each electrode from adhering to the corresponding surface of the edge portion Pe of the plate glass when the edge portion Pe is heated by being supplied with electric current. The table 12 on which the plate glass 16 is mounted as shown in FIG. 1 is disposed in an electric oven 20 which is provided thereinside with a heating wire 22 to heat the whole of the plate glass 16 on the table 12.

With the thus arranged apparatus 10, a plate glass having, for example, the dimensions 200 mm(width)×100 mm(length)×5 mm(thickness) is put onto the flat surface of the table 12 whose surface is electrically insulated, as shown in FIG. 1. This plate glass 16 is then heated by the heating wire 22 so that the temperature in the whole of the plate glass 16 reaches to about 350° C. Simultaneously, only the edge portion Pe of the plate glass is locally heated to a temperature (about 500° C.) higher than that of the other portions of the plate glass 16 and lower than the softening temperature of the plate glass at which temperature the plate glass starts to soften. It is understood that since the whole of the plate glass 16 is heated as mentioned above, the plate glass 16 can be prevented from breaking which is caused by a considerable temperature difference between the edge portion Pe and the other portion of the plate glass 16. Moreover, the edge portion Pe forms a part of an electric circuit which has the least electric resistance when locally heated to about 500° C. as described above.

Figure 3:
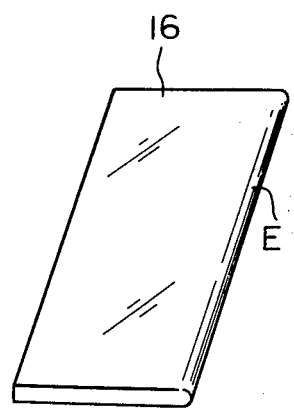
FIG. 3 is a perspective view of a plate glass whose edge has been treated by using the apparatus of FIG. 2 and by a process according to the present invention.

Thereafter, a voltage of about 5000 V is impressed on the electrodes 18a and 18b to supply the edge portion Pe of the plate glass 16 with an electric current of about 0.7 to 0.9 A. It will be understood that electric current flows only through the plate glass 16 since the flat surface of the table 12 on which the plate glass is mounted is covered with the electric insulating material M as described before. Consequently, so-called Joule heat is generated in the edge portion Pe and the temperature in the edge portion Pe reaches to the softening temperature at which the plate glass begins to soften and deform. Thus, after the temperature in the edge portion Pe reaches to the softening temperature such as about 1100° C., the corners of the edge E of the plate glass 16 is rounded off by virtue of the surface tension of the slightly molten glass. Accordingly, the edge E of the plate glass 16 is formed into the shape of a circular arc, in cross-section, having a radius of curvature approximately equal to half the thickness of the plate glass 16, as shown in FIG. 3.

After the edge treatment of the plate glass 16 is thus completed, electric current supply to the heating unit 14 and to the electrodes 18a and 18b is stopped. Then, electric current supply to the heating wire 22 is controlled to slowly cool down or anneal the plate glass 16 so that the temperature of the plate glass 16 reaches room temperature. This annealing reduces the internal stresses of the plate glass, providing a stable plate glass. Alternately, electric current supply to the heating wire 22 may be continued to heat the whole of the plate glass to a tempering temperature such as 630° C. after the above-mentioned edge treatment is completed, and the plate glass 16 may be subsequently rapidly chilled to obtain a strong tempered glass.

What is claimed is:

1. A process for treating an edge of a flat plate glass, comprising:
   heating the whole of the plate glass to a first temperature;
   heating only a straight and elongate edge portion of the plate glass including the edge to a second temperature higher than that in the other portion of the plate glass and lower than the softening temperature of the plate glass, said second temperature being higher than said first temperature, said heating the edge portion being carried out by using a straight and elongate heating unit disposed along the edge portion of the plate glass, said heating unit being located spaced apart from and near the surface of the edge portion;
   applying electric current to the edge portion of the plate glass through a pair of electrodes which are contacted to both side surfaces of the edge portion, respectively, thereby to raise the temperature in the edge portion to the softening temperature of the plate glass.

2. A process as claimed in claim 1, further comprising the step of contacting said pair of electrodes to the both side surfaces of the edge portion, respectively, which both side surfaces are opposite to each other.

3. A process as claimed in claim 1, in which the step of heating the whole of the plate glass is carried out in an electric oven which is equipped with a heating wire therein.

4. A process as claimed in claim 3, in which said first temperature is about 350° C.

5. A process as claimed in claim 3, in which said second temperature is 500° C.

6. A process as claimed in claim 3, in which the step of applying electric current includes the step of impressing a voltage of 5000 V on the pair of electrodes.

7. An apparatus for treating an edge of a flat plate glass, comprising:
   supporting means for supporting the plate glass;
   first heating means for heating the whole of the supported plate glass to a first temperature;
   second heating means for heating only a straight and elongate edge portion of the plate glass including the edge to a second temperature which is higher than that of the other portion of the plate glass and lower than the softening temperature of the plate glass, said second temperature being higher than said first temperature, said second heating means including a straight and elongate heating unit secured to said supporting means along the edge portion of the supported plate glass, said heating unit being located spaced apart from and near the surface of the edge portion;
   a pair of electrodes contacted to both side surfaces of the edge portion of the plate glass, respectively, which both side surfaces are opposite to each other, said electrodes being supplied with electric current to raise the temperature in the edge portion to the softening temperature of the plate glass.

8. An apparatus as claimed in claim 7, in which said supporting means is a heat-resistant table the flat surface of which is covered with an electrical insulating material on which the plate glass is mounted.

9. An apparatus as claimed in claim 8, in which said electrical insulating material is made of mica.

10. An apparatus as claimed in claim 7, in which said first heating means includes a heating wire disposed in an electric oven.

11. An apparatus as claimed in claim 7, in which said first temperature is about 350° C.

12. An apparatus as claimed in claim 11, in which said second temperature is about 500° C.

13. An apparatus as claimed in claim 7, in which each of said electrodes is of a cylindrical shape.

14. An apparatus as claimed in claim 13, in which each of said electrodes is made of carbon.

15. An apparatus as claimed in claim 13, in which each of said electrodes is made of molybdenum.

16. An apparatus as claimed in claim 13, in which each of said electrodes is made of platinum.

17. A process as claimed in claim 1, in which said heating unit generates heat by supplying electric current thereto.

18. An apparatus as claimed in claim 7, in which said heating unit generates heat by supplying electric current.

* * * * *